United States Patent [19]
Wilwerding

[11] 4,091,275
[45] May 23, 1978

[54] AUTOMATIC FOCUS SYSTEM WITH OSCILLATION INHIBIT CIRCUIT

[75] Inventor: Dennis J. Wilwerding, Littleton, Colo.

[73] Assignee: Honeywell Inc., Minneapolis, Minn.

[21] Appl. No.: 730,552

[22] Filed: Oct. 7, 1976

[51] Int. Cl.² ............................................. G01J 1/20
[52] U.S. Cl. .................................. 250/201; 352/140; 354/25; 356/4
[58] Field of Search .................. 250/201, 204; 354/25, 354/31, 60 A; 352/140

[56] References Cited

U.S. PATENT DOCUMENTS

| 3,572,928 | 3/1971 | Decker | 356/4 |
| 4,010,479 | 3/1977 | Nobusawa | 352/140 |

Primary Examiner—David C. Nelms
Assistant Examiner—Michael J. Tokar
Attorney, Agent, or Firm—Charles J. Ungemach

[57] ABSTRACT

An automatic continuous focus system includes means for inhibiting movement of the primary lens unless each focus control signal within a predetermined time requires position correction in the same direction.

5 Claims, 10 Drawing Figures

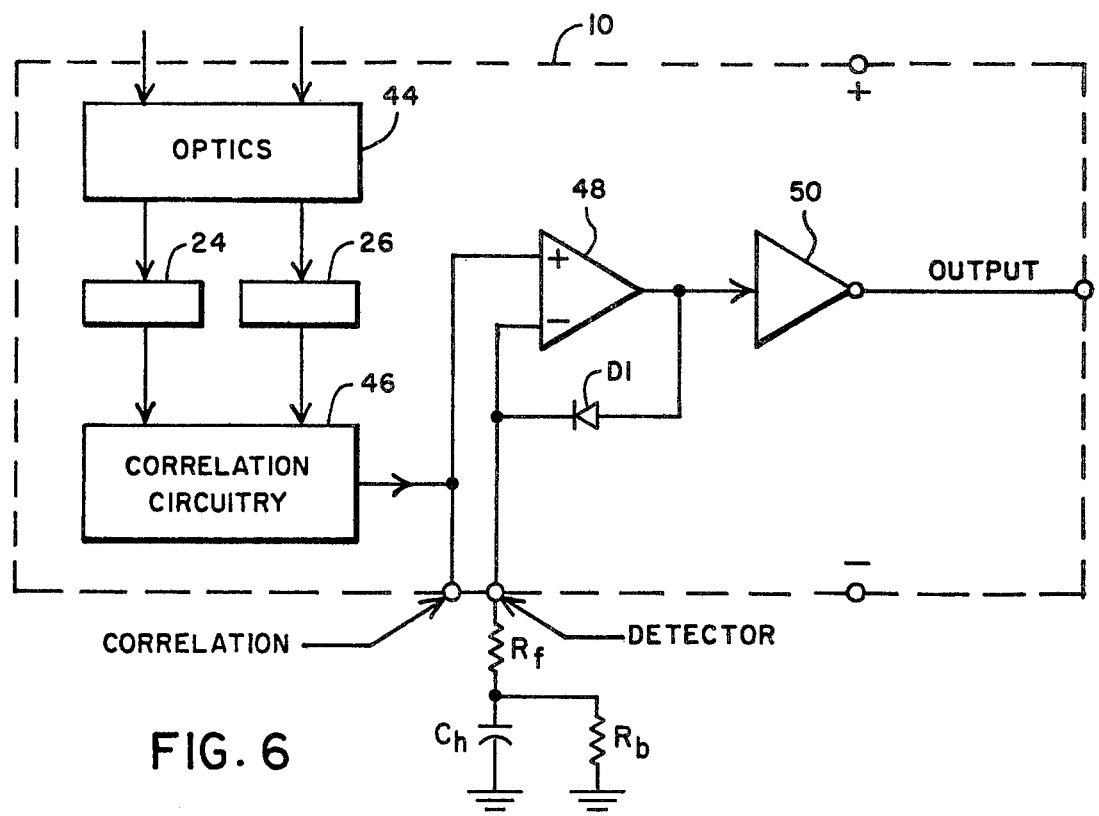
FIG. 6
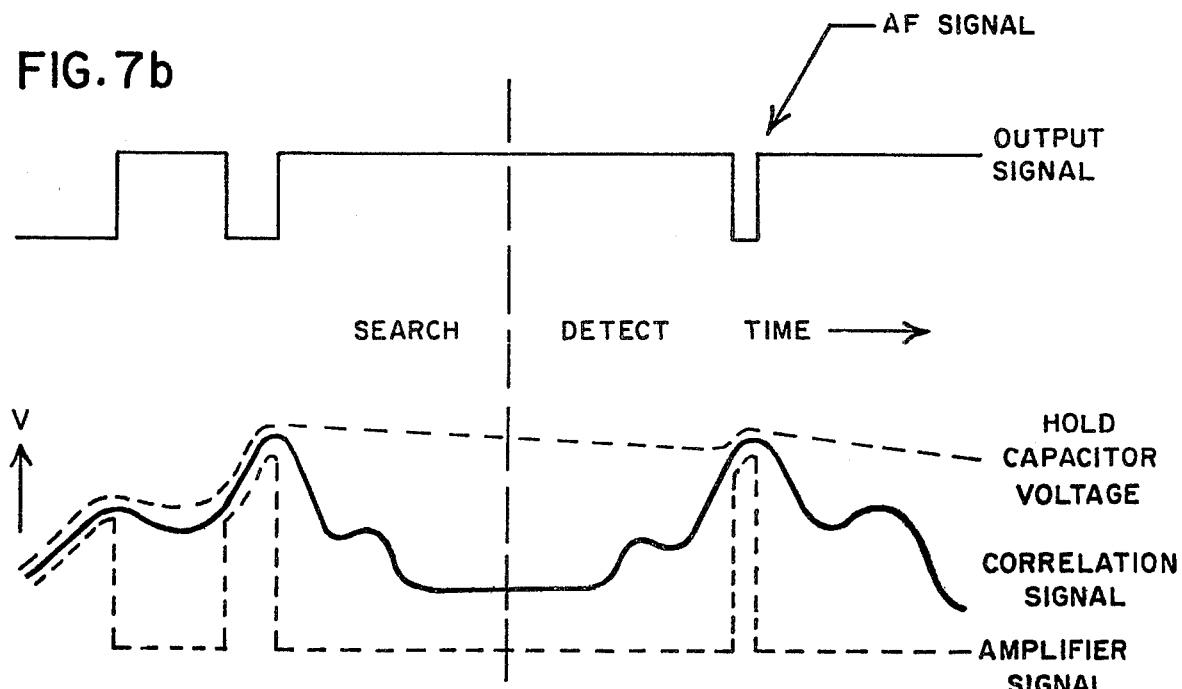
FIG. 7b
FIG. 7a

AUTOMATIC FOCUS SYSTEM WITH OSCILLATION INHIBIT CIRCUIT

REFERENCE TO CO-PENDING APPLICATION

Reference is made to co-pending application by Dennis J. Wilwerding, Ser. No. 728,567 entitled "Focus System for Movie Cameras" which was filed Oct. 1, 1976 and is assigned to the same assignee.

BACKGROUND OF THE INVENTION

The present invention relates generally to apparatus for providing a measure of the distance between the apparatus and an object. In particular, the present invention is directed to automatic focusing systems in which a primary optical means, such as the taking lens of a camera, is moved to maintain an image of the object in focus at the plane of a photographic film.

One highly advantageous type of automatic focus apparatus is the spatial image correlation type. Examples of the different forms of arrangements of this type can be found in co-pending U.S. Patent applications Ser. No. 627,607, filed Oct. 31, 1975 now U.S. Pat. No. 4,002,899, issued Jan. 11, 1977, and Ser. No. 700,963 filed June 29, 1976 by Norman L. Stauffer, which are assigned to the same assignee as the present application, in U.S. Pat. Nos. 3,836,772, 3,838,275, and 3,938,117 by Norman L. Stauffer, and in U.S. Pat. No. 3,274,914 by Biedermann et al.

The typical spatial image correlation apparatus includes two auxiliary optical elements (for example, lenses or mirrors) and two detector arrays. The object distance is determined by moving one of the auxiliary optical elements relative to one of the radiation responsive detector arrays until they occupy a critical or correlation position. This position is a measure of the existing object to apparatus distance.

The relative movement of the auxiliary optical element and the detector array occurs for each distance measuring or focusing operation. The critical condition occurs when there is best correspondence between the radiation distributions of the two auxiliary or detection images formed on the two detector arrays. This condition of best distribution correspondence results in a unique value or effect in the processed electrical output signals. Typically, the correlation signal will contain a major extremum (either a peak or a valley) and one or more minor extrema. The major extremum is indicative of the distance to the object.

In most systems, the relative movement of the auxiliary optical element with respect to the detector arrays is achieved by moving a lens or mirror relative to one of the detector arrays. The particular position of the element when best distribution correspondence occurs provides a determination of the existing object to apparatus distance. The position of the auxiliary optical element at the time of best correspondence is used to control the position of the primary optical element, such as a camera taking lens.

In the previously mentioned co-pending application Ser. No. 700,963 by Norman L. Stauffer, the correlation signal includes a major peak which is indicative of the distance to an object. A peak detector is used to determine this major peak. A complete scan of all focus zones is provided to insure that the highest correlation is achieved. The location of the last and, therefore, highest peak detected corresponds to the desired focus position.

Continuous focus operation as required in a movie camera is achieved by determining the relative position of the lens and scanning mirror when the major peak is detected. Position correction signals are generated which cause the lens to be driven in either the near or the far direction. The system is constantly "hunting" for the correct focus position, since only the direction of focus error, and not its magnitude, is known. This oscillation can be eliminated by creating a region in time following the major peak or the lens-mirror relative position signal in which the occurrence of the other signal will inhibit motor operation (deadband). The use of a dead band is described in detail in the previously mentioned copending application by Dennis J. Wilwerding. In this type of system, it is desirable to have the deadband region small to minimize focus errors.

SUMMARY OF THE INVENTION

The present invention is based upon the discovery that the previous systems will still tend to oscillate if noise is present on the correlation signal (such as 120 Hz fluorescent common mode noise introduced into the system optically) since the noise imparts a randomness to the location of the correlation peak. The previous systems can be stabilized by increasing the size of the deadband, but only at the expense of focus error.

A solution to the problem is to inhibit the lens positioning motor operation for a specified time following each signal indicating a change in the direction of focus correction or correct focus. If all focus correction signals are in the same direction for the specified time, the system is allowed to correct the focus error; conversely, if the indicated focus position is randomly varying about the true focus position, the correction will be inhibited. If the true focus position is shifted somewhat from the mean of the randomly varying indicated focus position, statistically, several focus correction signals will occur in the same direction causing the focus correction to occur.

BRIEF DESCRIPTION OF THE DRAWINGS

FIG. 6 shows the peak detection circuitry associated with the module of FIG. 1.

FIGS. 7a and 7b show an example of the hold capacitor voltage, correlation signal amplifier signal, and output signal produced by the module of FIGS. 1 and 6.

DETAILED DESCRIPTION OF THE PREFERRED EMBODIMENTS

Image Correlation Range Sensing Means

Figure 1:
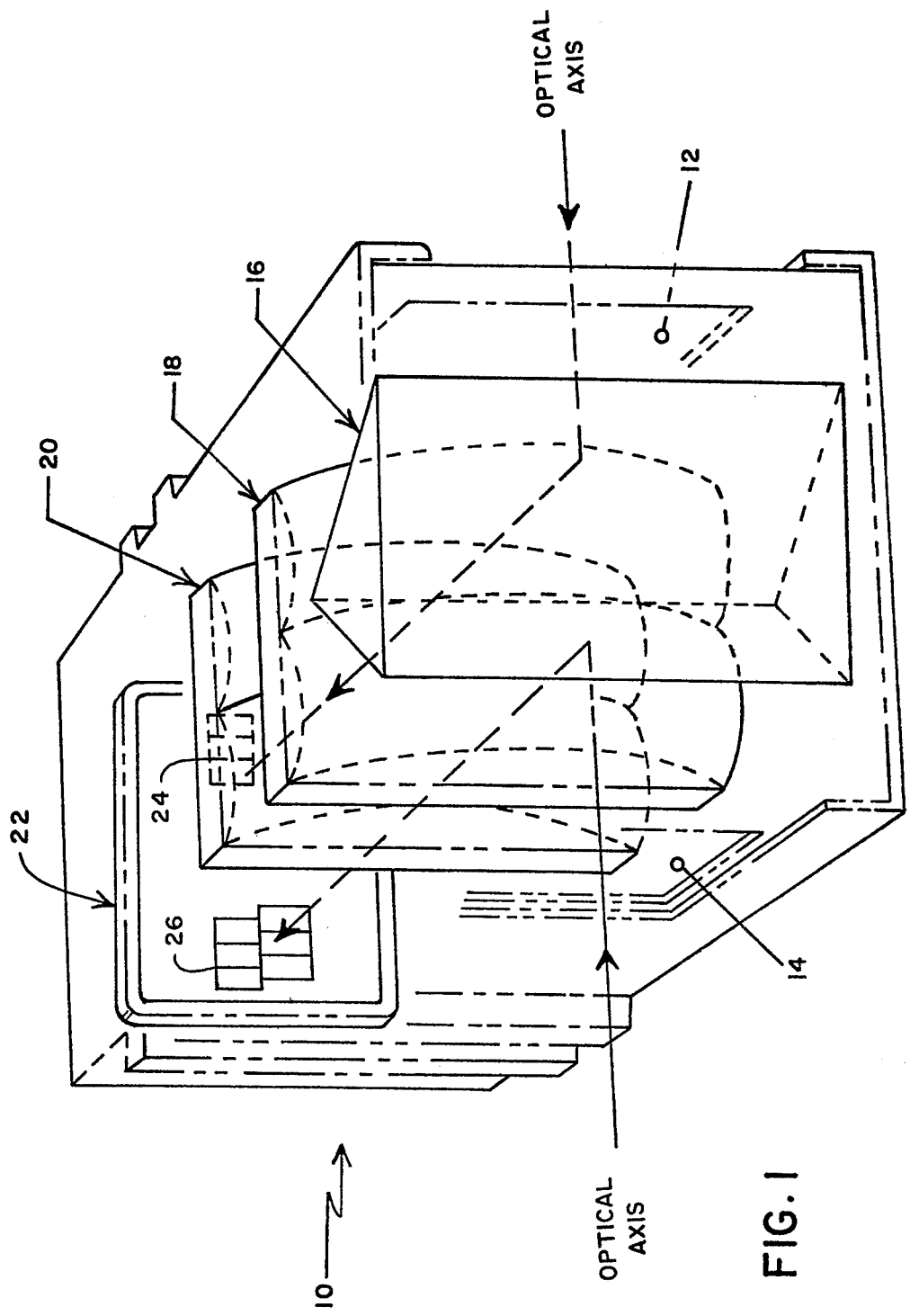
FIG. 1 shows a spatial image correlation range sensing module which may be used in conjunction with the automatic focus system of the present invention.

FIG. 1 shows one particularly advantageous form of image correlation range sensing means which may be used in the correction automatic focus system. A more detailed description of this modular form of range sensing means may be found in the co-pending application by Norman L. Stauffer, Ser. No. 627,607, now U.S. Pat. No. 4,002,899, issued Jan. 11, 1977.

Module 10 of FIG. 1 has two viewing ports, 12 and 14, located on opposite sides. Inside the module is a prism, 16, a twin two-element lens system formed by twin biconvex lens 18 and twin meniscus lens 20, and an integrated circuit 22 including detector arrays 24 and 26 and signal processing circuitry (not shown) connected to the detector arrays. The elements in the module are permanently mounted and require no adjustment or alignment.

Figure 2:
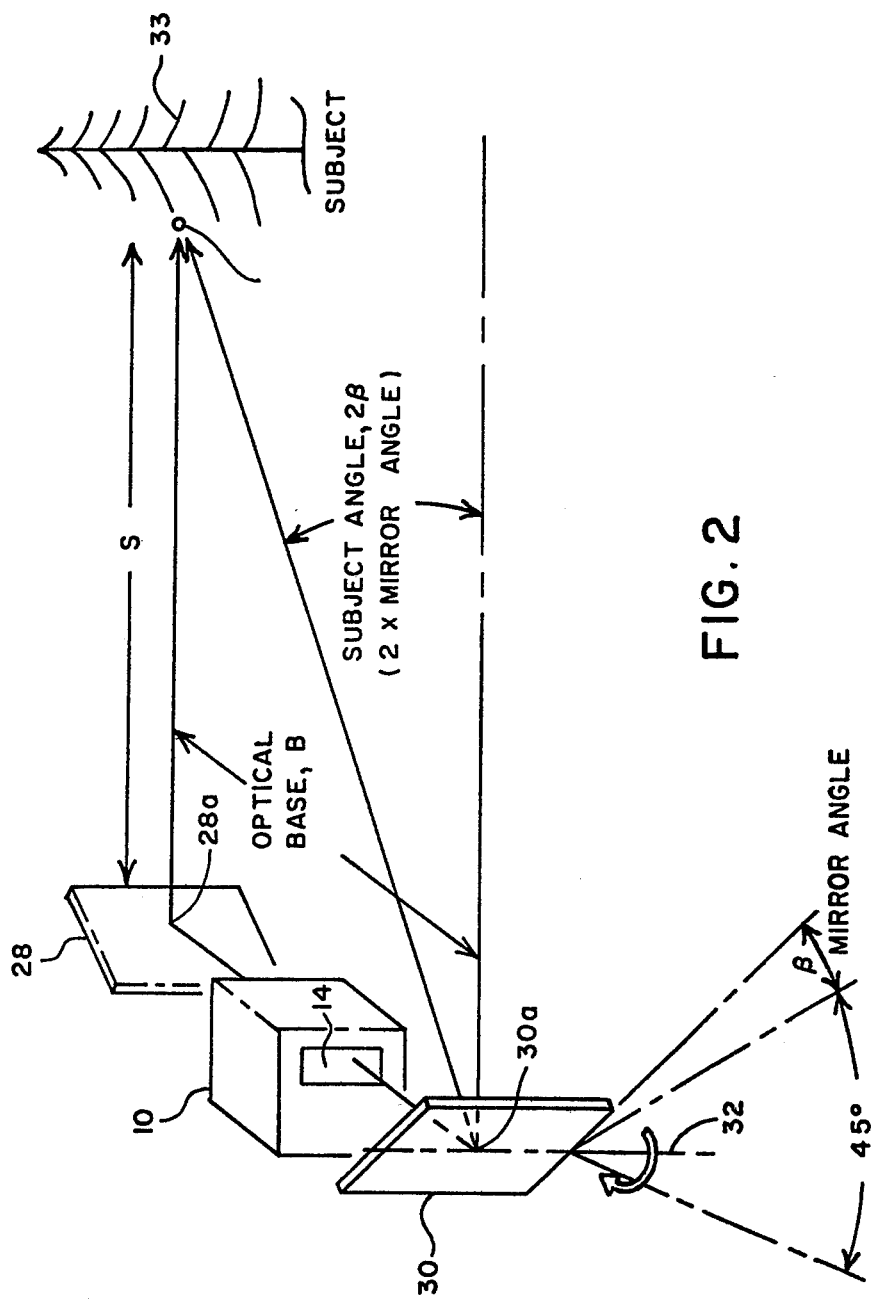
FIG. 2 shows the basic optical configuration of a system using the module of FIG. 1.

To use module 10, two mirrors, 28 and 30, must be positioned so as to direct light from the subject into the two viewing ports. Such a basic system is illustrated in FIG. 2. Mirror 28 provides a fixed view of a portion of the subject field. This portion of the field is imaged within the module 10 onto detector array 24. Mirror 30 is mounted so that it can be rotated about an axis, 32, generally perpendicular to the plane formed by points 28a and 30a on mirrors 28 and 30 and a centralized point 33a on a remote subject 33. Adjustment of mirror 30 allows detector array 26 to view a selected area of the subject field. The light intensity pattern on each array is nearly identical when the subject angle $2\beta$ fulfills the conditions.

$$\tan(2\beta) = (B/S),$$

where $\beta$ is the angle through which mirror 30 is rotated from a 45° position where light from infinity is reflected into viewing port 14. As seen in FIG. 2, angle $2\beta$ is also the angle between a line drawn from point 33a on subject 33 and point 30a on mirror 30, and a line drawn from point 33a on subject 33 and point 28a on mirror 28. B is the length of the base from point 28a on mirror 28 to point 30a on mirror 30, and S is the distance between point 33a on subject 33 and point 28a on mirror 28. This identity is recognized by the correlation electronics of integrated circuit 22 as a major extremum (preferably a peak) in the correlation signal.

Figure 3:
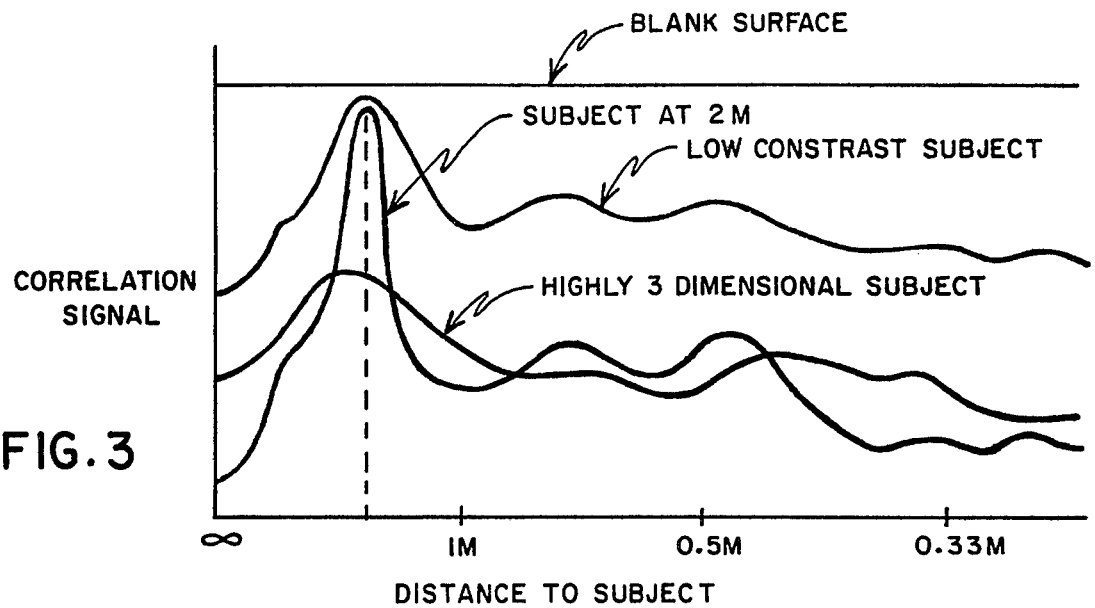
FIG. 3 shows the correlation signal as a function of distance to the subject for several different conditions.

FIG. 3 illustrates the correlation signal as a function of distance to the subject. In FIG. 3, a subject at approximately 2 meters distance from the optical system produces a peak output corresponding to that distance, as shown by the curve labelled "Subject at 2M." At the infinity position mirrors 28 and 30 are each at 45°, thus directing the optical axis from each into two parallel lines. As movable mirror 30 is adjusted from this position, the correlation signal as illustrated in FIG. 3 is produced. Secondary peaks of lesser amplitude may be present as indicated in FIG. 3. If the optical system views a complete blank surface, devoid of any brightness variations, then the correlation signal will be a constant high level. A very low contrast subject will produce, as indicated, a signal which does not drop very much below peak value at out-of-correlation conditions. A highly three-dimensional subject may not produce as high a peak signal as that produced by a strictly two-dimensional flat scene.

Continuous Focus Systems

Figure 4:
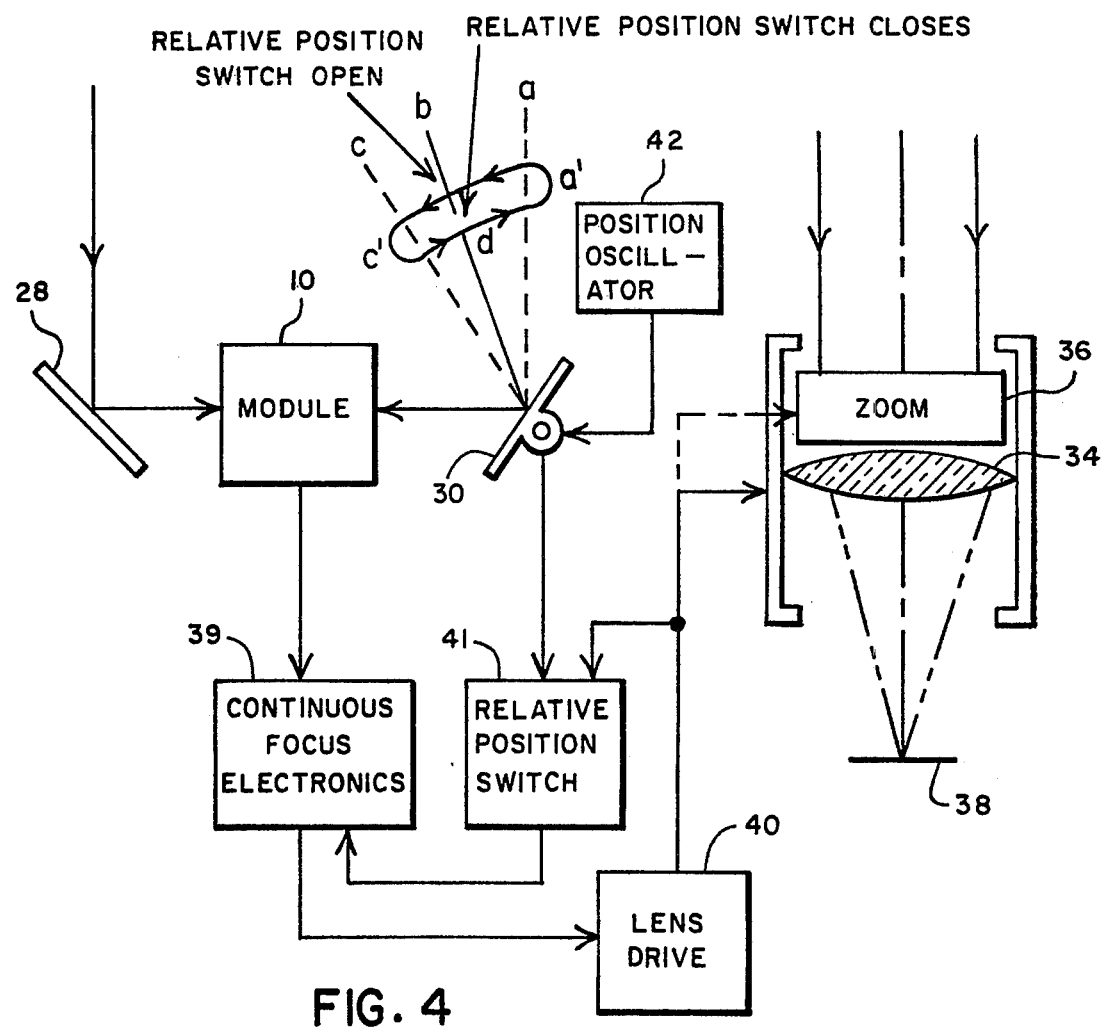
FIG. 4 shows a continuous focus system.

A dual scan continuous focus system for a movie camera is shown in basic diagram form in FIG. 4. This system is described in further detail in my previously mentioned co-pending application. The system includes module 10, mirrors 28 and 30, taking lens 34, zoom optics 36, film 38, continuous focus control electronics 39, lens drive 40, relative position switch 41, and position oscillator 42.

Scan mirror 30 is provided with a continuous oscillatory motion by position oscillator 42. This motion extends to a position $a'$ beyond infinity and to a position $c'$ somewhat inside of the desired near focus distance. Each scan cycle of scan mirror 30 includes a "search scan" and a "detection scan."

The opening and closing of relative position switch 41 signals the fact that taking lens 34 and scan mirror 30 are coincidentally looking at, and focused to, the same subject distance. Switch 41 is closed when mirror 30 is in the far field with respect to the position of lens 34 and is open when mirror 30 is in the near field with respect to the position of lens 34. Relative position switch 41 is connected to continuous focus control electronics 39.

Switch 41 may take a variety of different forms, depending on the particular mechanical embodiment of lens drive 40 and position oscillator 42. Examples of relative position switches are shown in the previously mentioned Stauffer application, Ser. No. 720,963. Relative position switch 41 must be able to operate for many cycles and should be capable of factory adjustment to permit system alignment.

Figure 5:
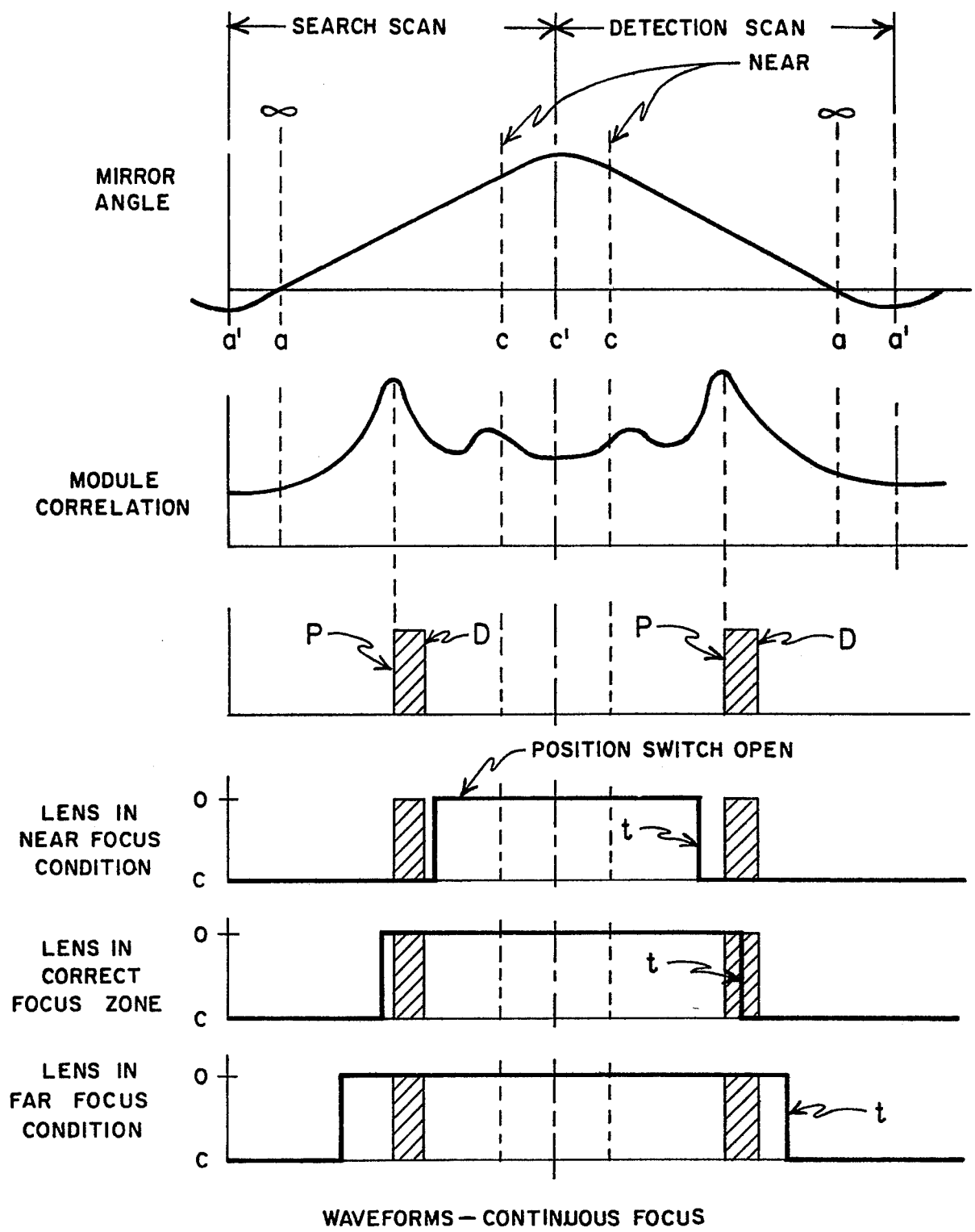
FIG. 5 shows waveforms associated with the operation of the system of FIG. 4.

FIG. 5 illustrates waveforms used in providing continuous focus control. The first waveform shows one cycle of the continuous oscillation of scan mirror 30. The cycle includes a search scan from $a'$ to $c'$ and a detection scan from $c'$ to $a'$. The second waveform shows the correlation signal resulting from this motion. This waveform is repeated over and over again in a continuous fashion when the same subject is viewed. The third waveform shows the creation of an AF signal, $p$, near the maximum correlation signal and also following this pulse a short time zone D, which is the focus deadband, and is selected to provide an acceptable zone of sharp focus and to provide non-oscillatory motion of the focusing system.

The operating of the system is as follows: The system first interrogates the various signals to determine if the trailing edge, $t$, of the time interval when the switch is open, occurs during the time interval D of the detection scan. If this is the case, then no focus drive signal can be provided and correct focus position is assumed. If this is not the case then circuitry determines if the AF signal occurred during the period the switch is open, or during the period that the switch is closed. An AF signal occurring during the switch open portion of the cycle causes the camera lens 34 to be driven toward its near limit position eventually causing it to fall within zone D, terminating focusing action with the subject in focus. Alternatively, if the AF signal occurs during the period when the switch is closed, continuous focus control electronics 39 causes camera lens 34 to be driven toward its infinity position stopping at the position which causes the subject to be in acceptable focus. Examples of these three conditions are illustrated in the fourth, fifth and sixth waveforms shown in FIG. 5.

The desirability of using a dual scan system is its highly reliable rejection of minor peaks which might activate the peak detection circuitry prematurely. The dual scan system also provides rejection of false correlation peaks which might be introduced by violent camera or subject motion.

Dual Scan Peak Detection and Production of the AF Signal

FIG. 6 shows module 10 as it is used in preferred embodiments of the present invention. Module 10 includes optics (generally designated by numeral 44) for forming two images, two detector arrays, 24 and 26, and correlation circuitry 46 for producing an analog correlation signal proportional to the degree of correlation of the respective optical images. The correlation signal increases positively with increasing correlation.

Extremum sensing circuitry is provided in module 10 to process the correlation signal to determine when the major correlation extremum occurs. In the preferred embodiment shown in FIG. 6, the major extremum is a peak and the extremum sensing circuitry is peak detection circuitry. This circuitry includes differential amplifier 48, diode D1, inverter 50, filter resistor $R_f$, discharge timing resistor $R_b$, and hold capacitor $C_h$. In the embodiment shown in FIG. 6, resistors $R_f$ and $R_b$ and capacitor $C_h$ are external components and are connected to the "Detector" terminal of module 10. Module 10 develops, at the terminal entitled "output" a digital positive going output signal (i.e. the AF signal), at correlation maxima capable of operating external circuitry to stop the camera lens at the proper focus position. It is this change of state of the output signal (i.e. the AF signal), and not the output signal level, which is indicative of the occurrence of a focus peak.

Hold capacitor $C_h$ connected to the "Detector" terminal provides a hold or comparison signal for the peak detection circuitry and to a large extent controls the sensitivity, noise rejection and overall characteristics of the focus system. Differential amplifier 48 compares the correlation signal with the voltage stored on hold capacitor $C_h$. As the correlation signal rises in voltage, the output of amplifier 48 rises in voltage with it, charging capacitor $C_h$ through feedback diode D1 connected between the output and inverting input. This causes the inverting input to follow the non-inverting input so that the voltage on capacitor $C_h$ is equal to the correlation signal voltage during that portion of time when the correlation signal is rising. Once the correlation signal reaches its peak value and begins to decrease, the voltage on the hold capacitor $C_h$ cannot decrease because of the decoupling of feedback diode D1. Consequently, the output voltage of amplifier 48 falls immediately to negative supply potential. This rapid decrease in the amplifier signal is indicative of a correlation or major peak having occurred. The amplifier signal following a complex correlation waveform is shown in FIG. 7a. FIG. 7b shows the output signal from module 10 produced for the dual scan of FIG. 7a.

During the search scan shown in FIGS. 7a and 7b, the amplifier signal follows the input correlation signal until the first minor peak is reached, at which time the signal drops to negative supply. The amplifier signal begins to rise again when the correlation signal achieves the value equal to the first minor peak and continues to rise until the major peak or correlation peak is found. At this point, the amplifier signal again drops to negative supply. During the detection scan, only the correlation peak is detected. This is because hold capacitor $C_h$ has maintained a voltage proportional to the correlation peak detected during the search scan. This hold capacitor voltage or "comparison signal" exceeds the correlation signal for all portions of the detection scan, except the correlation peak. This is the primary virtue of dual scan operation.

While the peak detection circuitry must be capable of accurately following the correlation signal and determining when a peak occurs, it must at the same time be insensitive to noise on the correlation signal. Noise immunity is achieved by filter resistor $R_f$ in series with the hold capacitor $C_h$. In FIG. 6, resistor $R_f$ is external to module 10 and preferably has a value of about 300 ohms to maintain amplifier stability. Alternatively, filter resistor $R_f$ may be included in module 10. Filter resistor $R_f$ creates a lag in the hold capacitor voltage so that when the correlation signal begins to decrease, it must decrease by some finite value before the amplifier signal from amplifier 48 changes states.

Continuous Focus Control Electronics

The AF signal (i.e. the positive logic "0" to "1" transition in the output signal) indicates that a correlation peak has occurred. The continuous focus control electronics uses the AF signal to develop a control signal capable of moving the camera lens to the proper focus position by operation of lens drive means.

Figure 8:
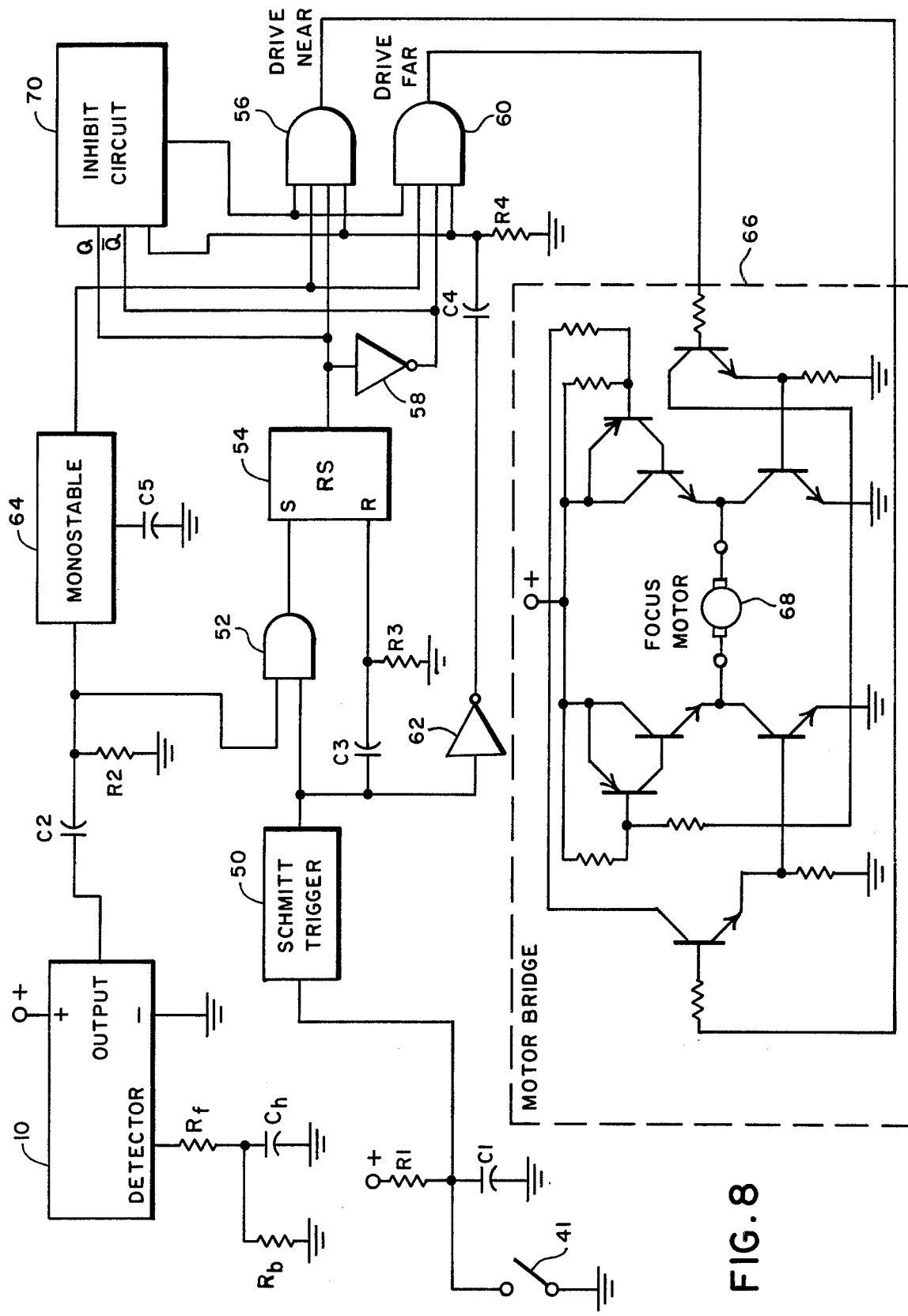
FIG. 8 is a schematic diagram of continuous focus control electronics including the inhibit circuit of the present invention.

FIG. 8 shows a schematic diagram of a preferred embodiment of the continuous focus control electronics for a dual scan continuous focus system. All timing signals for the system of FIG. 8 are derived from relative position switch 41 which indicates the positional relationship of the taking lens of the camera and the scanning mirror. In the embodiment shown in FIG. 8, switch 41 is closed when the scanning mirror is in the far field with respect to the taking lens position and is open when the scanning mirror is in the near field with respect to the lens position.

Resistor R1 and capacitor C1 are connected in series between a positive voltage supply terminal and ground. Switch 41 is connected in parallel with capacitor C1. R1 and C1 form a filter to prevent false signals caused by contact bounce. Schmitt trigger 50 has its input terminal connected to the junction of resistor R1 and capacitor C1. The output of Schmitt trigger 50, therefore, is determined by the state of switch 41.

The output signal from module 10 is differentiated by resistor R2 and capacitor C2. A positive pulse is produced when the AF signal occurs. The differentiated output signal and the output of Schmitt trigger 50 are applied to the input terminals of AND gate 52. The output of AND gate 52 is connected to the set input of RS flip-flop 54. RS flip-flop 54 is set (a logic "1") only when the AF signal occurs while the mirror is in the near field, since output of Schmitt trigger 50 is a "1" when switch 41 is open.

The output of Schmitt trigger 50 is differentiated by capacitor C3 and resistor R3 and applied to the reset input of RS flip-flop 54. A reset pulse is applied to RS flip-flop 54, therefore, when the mirror enters the near field (i.e. Schmitt trigger 50 switches from a "0" to a "1").

The output of RS flip-flop 54 is applied to one input of AND gate 56. The output of RS flip-flop 54 is also inverted by inverter 58 and applied to one input of AND gate 60. The second inputs to AND gates 56 and 60 are produced by inverter 62, capacitor C4, and resistor R4. Inverter 62 inverts the output of Schmitt trigger 50, and capacitor C4 and resistor R4 differentiate the inverted signal. The resulting input to AND gates 56 and 60 is an interrogate pulse which occurs when switch 41 closes, indicating that the mirror is entering the far field.

The third input to AND gates 56 and 60 is derived from monostable 64. This input is a deadband signal which is normally a logic "1" but which may temporarily be a logic "0" for a time period determined by capacitor C5. The input to monostable 64 is connected to the differentiator formed by C2 and R2. Monostable 64, therefore, produces a pulse in response to the AF signal. The outputs of AND gates 56 and 60 are connected to the drive-near and drive-far inputs of motor bridge 66. Motor bridge 66 drives motor 68, which positions the taking lens. A "1" at the output of AND gate 56 causes motor bridge 66 to drive motor 68 and, therefore, the taking lens in the near field direction. Similarly, a "1" at the output of AND gate 60 causes motor bridge 66 to drive motor 68 and the taking lens in the far field direction.

The fourth input to AND gates 56 and 60 is received from inhibit circuit 70. The inputs to inhibit circuit 70 are the output of RS flip-flop 54, the inverted output of RS flip-flop 54, and the interrogate pulse. If the focus correction signals (determined by the state of RS flip-flop 54 at the occurrence of the interrogate pulse) all require correction in the same direction for a predetermined amount of time, the output of inhibit circuit 70 becomes "1". If, on the other hand, the focus correction signals are randomly varying, the output of inhibit circuit 70 is a "0" and operation of motor 68 is inhibited.

The operation system of FIG. 8 is generally as follows: only the highest correlation signal will produce a peak detector output if the peak detector capacitor $C_h$ is not reset after each scan. Resistor $R_b$ provides some drive-down of the capacitor voltage on $C_h$ to ensure detection of the correlation peak. Using this knowledge, it is only necessary to determine if the AF signal occurs in the near or far field with respect to the prime lens focus position. This is accomplished by differentiating the AF signal and ANDing this signal with a signal corresponding to the positional relationship of the taking lens and the scanning mirror. The positional relationship signal is provided by switch 41, resistor R1, capacitor C1, and Schmitt trigger 50.

In the system shown in FIG. 8, the output of AND gate 52 is a "1" only when the AF signal occurs while the scanning mirror is in the near field with respect to the taking lens position. This situation can, of course, be reversed and the signals processed only for an AF signal occurring in the far field.

The output signal of AND gate 52 sets RS flip-flop 54, which was previously reset when the scanning mirror entered the near field. The state of RS flip-flop 54 is interrogated at the instant that the scanning mirror passes from the near to the far field (i.e., that point at which the taking lens focus position and the scanning mirror focus position are coincident). The state of the RS flip-flop 54 is, therefore, indicative of whether the taking lens should be moved toward the near range or the far range. The interrogation is accomplished by differentiating the falling edge of the output of Schmitt trigger 50 with inverter 62, capacitor C4 and resistor R4, and applying this interrogate signal and the RS output to AND gates 56 and 60. The output of AND gate 56 goes to a "1" at interrogation when the AF signal occurs while the scanning mirror is in the near field. Similarly, the output of AND gate 60 goes to a "1" when the AF signal occurs while the scanning mirror is in the far field.

The first exception to this rule is created by the third input to AND gates 56 and 60. Monostable 64 provides the third inputs to AND gates 56 and 60. The output of monostable 64 is normally a "1" but is temporarily a "0" for a period which is started by the differentiated AF signal. The purpose of monostable 64 is to provide a focus deadband in which no motor drive pulse is given. This effectively eliminates continuous hunting for the exact focus point. A "0" output from monostable 64 effectively inhibits the interrogation pulse at AND gates 56 and 60 if the AF signal occurs sufficiently close to the edge of the near range window such that the monostable output pulse overlaps the interrogation pulse in time. In this state, no pulses are transmitted through AND gates 56 and 60 and, consequently, no motor pulses are generated.

The focus motor 68 moves the lens in a direction such that the position of the lens-mirror relation window is coincident with the AF signal. Motor 68 is connected to a bridge 66 such that it may be driven in either direction, the direction corresponding to which AND gates 56 or 60 transmits a pulse. In those systems in which the motor drive time from these pulses is insufficient to adequately move the lens, monostables may be added at the outputs of AND gates 56 and 60 to stretch the motor drive pulses to the desired length.

The second exception to the rule is created by the fourth input to AND gates 56 and 60. Inhibit circuit 70 provides the fourth inputs to AND gates 56 and 60. The output of inhibit circuit 70 is normally "0" until all focus correction signals are in the same direction for a predetermined time. This prevents or inhibits any motor drive pulse from being produced as a result of random oscillation due to noise in the correlation signal, such as 120 Hz fluorescent common mode noise introduced into the system optically. The taking lens, therefore, remains at the same position despite random oscillation in the focus correction signals.

Oscillation Inhibit Circuit

Figure 9:
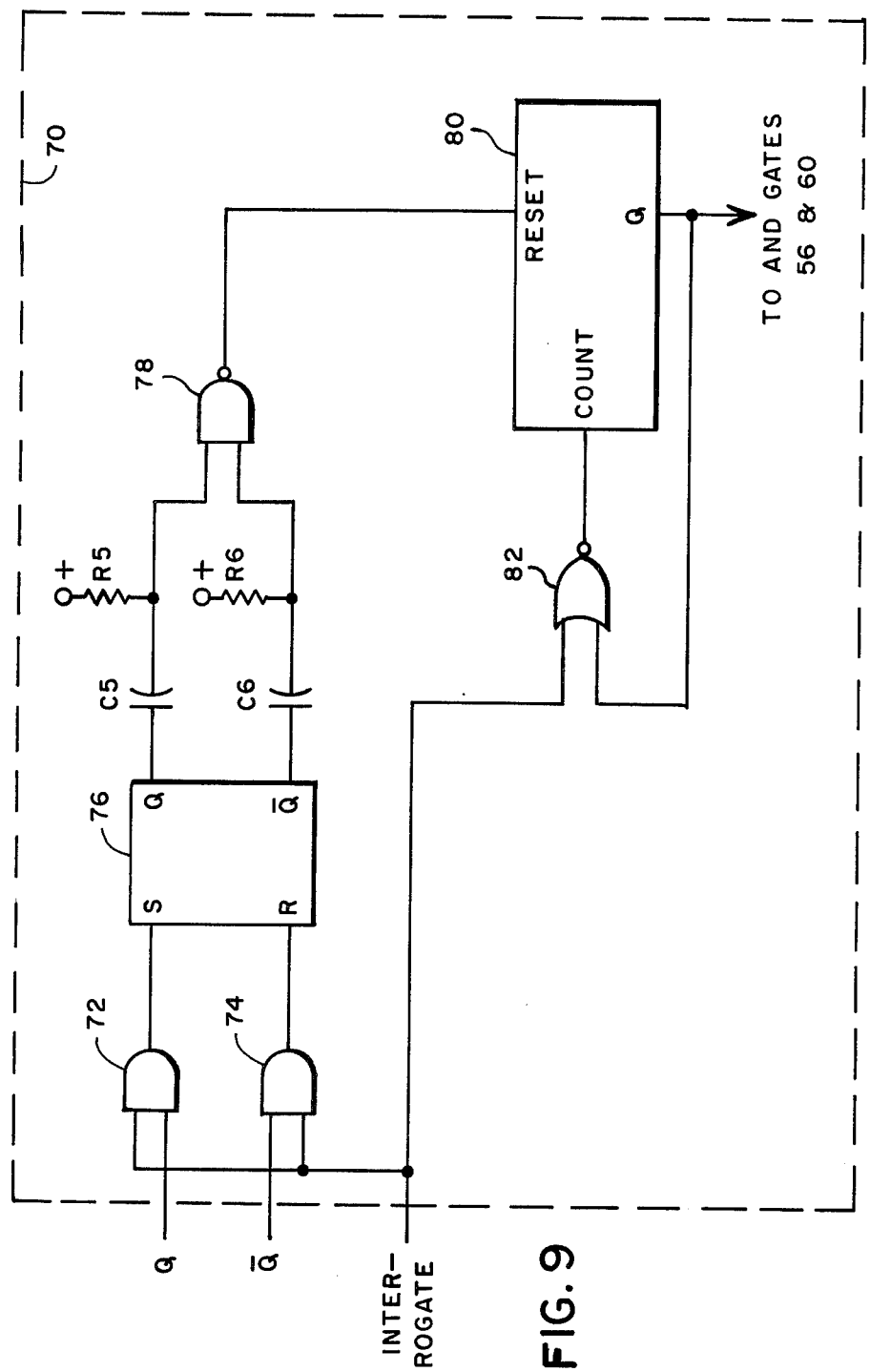
FIG. 9 is a schematic diagram of a preferred embodiment of the inhibit circuit of the present invention.

The inhibit circuit of the present invention can take a number of different forms. FIG. 9 shows a schematic diagram of a preferred embodiment of the inhibit circuitry.

FIG. 9, inhibit circuit 70 has three inputs and an output. The inputs are the Q and $\overline{Q}$ inputs which are received from RS flip-flop 54 and the interrogate pulse which is received from the differentiater formed by C4 and R4. The output of inhibit circuit 70 is applied as the fourth input to AND gates 56 and 60 of FIG. 8.

The inhibit circuit of FIG. 9 includes AND gates 72 and 74, RS flip-flop 76, capacitors C5 and C6, resistors R5 and R6, NAND gate 78, ripple counter 80, and NOR gate 82.

The Q and $\overline{Q}$ inputs are applied to AND gates 72 and 74, respectively. The interrogate pulse is also applied to AND gates 72 and 74 and is ANDed with the Q and $\overline{Q}$ inputs respectively. The output of AND gate 72 is applied to the set input of RS flip-flop 76. Similarly, the output of AND gate 74 is applied to the reset input of RS flip-flop 76.

Capacitor C5 and resistor R5 form a differentiater which is connected between the Q output of RS flip-flop 76 and one input of AND gate 78. Similarly, capacitor C6 and resistor R6 form a differentiater connected between the $\overline{Q}$ output of RS flip-flop 76 and the other input of NAND gate 78.

The output of NAND gate 78 is applied to the reset input of ripple counter 80. The count input of ripple counter 80 is received from NOR gate 82. The inputs to NOR gate 82 are the interrogate pulse input and the output Q of counter 80. The output of counter 80 is also applied to AND gates 56 and 60.

The operation of the inhibit circuit of FIG. 9 is as follows. As discussed previously with respect to FIG. 8, the state of the Q and $\overline{Q}$ inputs at the occurrence of the interrogate pulse indicate the direction of required focus correction. These inputs are applied both to inhibit circuit 70 and to AND gates 56 and 60, which control the motor bridge 66.

With each scan cycle, an interrogate pulse is produced. If the Q input to inhibit circuit 70 is a "1", a positive going pulse is applied to the set input of RS flip-flop 76. Similarly, if the $\overline{Q}$ input is a "1", a positive going pulse is applied to reset input of RS flip-flop 76. As long as the direction of focus correction remains the same (i.e. a state of Q and $\overline{Q}$ is always the same upon the occurrence of the interrogate pulse), the state of RS flip-flop 76 remains the same. Both inputs to NAND gate 78 are "1", and the output of NAND gate 78 remains a "0". If, however, the direction of focus correction changes, the state of RS flip-flop 76 changes. This causes a negative going pulse to be applied to one of the two inputs of NAND gate 78, which results in a positive pulse being applied to the reset input of ripple counter 80. Each time a reset pulse is received by ripple counter 80, the count is reset (typically to zero).

Ripple counter 80 counts each interrogate pulse so long as the output of ripple counter 80 is a "0". When counter 80 finally reaches a predetermined count without being reset, the output of counter 80 changes from "0" to "1". AND gates 56 and 60 are enabled when the output of counter 80 is a "1".

NOR gate 82 acts as a latch to maintain counter 80 in the full condition once the counter is full and the output of the counter has changed to a "1". Upon being the occurrence of a reset pulse, the output of counter 80 changes back to a "0" and the output of NOR gate 82 changes again to a "1". Each successive interrogate pulse will cause a negative going pulse which is counted by counter 80.

The inhibit circuit of FIG. 9, therefore, inhibits the motor operation for a specified time following each signal which indicates a change in the direction of focus correction or correct focus. If all focus correction signals are in the same direction for the specified time (i.e. RS flip-flop does not change state), the system is allowed to correct the focus error. As long as counter 80 remains full, the motor is allowed to operate. Each time RS flip-flop 76 changes state, counter 80 is reset and the motor is inhibited from operating until the counter is again full. If the focus position is randomly varying about the true focus position as a result of noise on the correlation signal, the motor is inhibited.

The basis of the present invention is the fact that if the true focus position is shifted somewhat from the mean of the randomly varying indicated focus position, statistically, several consecutive focus correction signals will occur in the same direction. The stability of the system may be adjusted by selecting the predetermined time or the number of consecutive focus correction signals which must be in the same direction. In a preferred embodiment of the present invention, a ripple counter is a binary counter. The output of the binary counter may be selected so that two, four, eight or more counts must occur without any changes in the state of RS flip-flop 76.

Conclusion

The inhibit circuit of the present invention overcomes a problem which has been encountered in the operation of continuous automatic focus control systems. Oscillation and random variation in the focus position can be overcome by using the present invention.

While the present invention is disclosed with reference to a series of preferred embodiments, workers skilled in the art will recognize that changes may be made in form and detail without departing from the spirit and scope of the invention. For example, although the present invention has been described for convenience in the context of a dual scan automatic focus system, it is easily applicable to other automatic focus systems as well. In addition, although the preferred embodiment of the inhibit circuit is shown in FIG. 9, the other circuits can also be used. Other methods of timing, such as capacitor charging and voltage level detection, for example, can replace the ripple counter shown in FIG. 9. In each embodiment, however, position correction is inhibited for a predetermined time or a predetermined number of counts during which all focus correction signals must be in the same direction.

The embodiments of the invention in which an exclusive property or right is claimed are defined as follows:

1. In a continuous focus system having focus control means for providing focus correction signals, and positioning means for positioning optical means in response to the focus correction signals, the improvement comprising:
   inhibit means for inhibiting the positioning means unless each focus correction signal within a predetermined time requires position correction in the same direction.

2. The invention of claim 1 wherein the inhibit means comprises:
   counter means having a count input for receiving count signals, a reset input for receiving reset signals, and an output, the output having an enable state when the counter is full and an inhibit state when the counter is not full; and
   reset means for applying a reset signal to the reset input if the focus control signals require a change in position correction direction.

3. The invention of claim 2 wherein the inhibit means further comprises:
   latch means for latching the counter means in the enable state once the counter is full until a reset signal is received.

4. The invention of claim 2 and further comprising:
   timing means for periodically supplying the count signals.

5. In a continuous automatic focus system having focus control means for providing focus correction signal, and positioning means for positioning optical means in response to the focus correction signals, the improvement comprising:
   inhibit means for inhibiting the positioning means from positioning the optical means in response to the focus correction signals unless a predetermined number of consecutive focus correction signals require position correction in the same direction.

* * * * *